United States Patent
Winthrop et al.

[11] 3,850,527
[45] Nov. 26, 1974

[54] APPARATUS AND METHOD FOR DETECTING AND VIEWING TRANSPARENT OBJECTS IN THE VITREOUS HUMOR

[75] Inventors: John Talley Winthrop, Wellesley; Raoul Fredrik Van Ligten, Marlboro; Kenneth Charles Lawton, Framingham, all of Mass.

[73] Assignee: American Optical Corporation, Southbridge, Mass.

[22] Filed: Feb. 12, 1973

[21] Appl. No.: 331,918

[52] U.S. Cl. .......................... 356/129, 351/7, 350/13
[51] Int. Cl. ........................................... G01n 21/46
[58] Field of Search ............. 351/13, 14, 39, 8, 9, 6, 351/16, 7, 8; 356/129, 130, 136, 106, 103, 104, 39; 350/13

[56] References Cited
UNITED STATES PATENTS

| | | | |
|---|---|---|---|
| 2,732,753 | 1/1956 | O'Konski | 356/103 |
| 3,131,695 | 5/1964 | Keeler | 128/76.5 |
| 3,259,041 | 7/1966 | Okajima | 351/7 |
| 3,420,600 | 1/1969 | Mevers et al. | 356/106 |
| 3,572,910 | 3/1971 | Koester | 351/13 |
| 3,586,444 | 6/1971 | Sproul et al. | 356/129 |
| 3,640,610 | 2/1972 | Nupuf | 351/13 |
| 3,685,887 | 8/1972 | Spurney | 351/13 |

Primary Examiner—William L. Sikes
Assistant Examiner—Conrad Clark
Attorney, Agent, or Firm—Alan H. Spencer; William C. Nealon

[57] ABSTRACT

Vitreous strands having an index of refraction slightly different from that of the vitreous humor can be observed by illuminating the portion of the vitreous humor to be viewed with a ring of light having a predominant wavelength suitable to maximize the effect of the difference in indexes of refraction with an observation system having a means to create an interference image or diffraction image.

Apparatus for visual observation or photographic recordation of strands in the vitreous humor includes an illumination system providing an annular light source having a pre-selected predominant wavelength focused on the retina which may be re-focused to vary the portion of the vitreous humor to be observed and an observation system having a means to partially occlude the real image of the annular light source reflected from the retina and an optical system adapted to focus on an object in the vitreous humor or lens of the eye and create an image by diffraction or interference methods.

Vitreous strands having a difference in index of refraction from that of the vitreous humor in the order of 0.001 and a diameter of about 0.6mm may be observed by the foregoing method and apparatus.

16 Claims, 5 Drawing Figures

PATENTED NOV 26 1974 3,850,527

APPARATUS AND METHOD FOR DETECTING AND VIEWING TRANSPARENT OBJECTS IN THE VITREOUS HUMOR

BACKGROUND OF THE INVENTION

This invention relates to a method and apparatus for viewing strands in the vitreous humor of the eye. More particularly, this invention relates to improved techniques and equipment capable of viewing vitreous strands in the human eye before they have developed to an injurious extent.

Prior art systems used to detect vitreous strands and similar transparent objects in the vitreous humor and/or the lens of an eye did not have sufficient sensitivity to enable such objects to be detected before the difference in index of refraction between the object and the surrounding medium had become very great or the strand(s) had torn at least a portion of the retina from the choroid. Thus, prior art detection systems were generally impractical since the damage caused by the strands or other transparent objects had usually been done before detection was possible. Furthermore, some prior art techniques even involved surgical procedures to detect such objects.

One prior art technique utilized illumination of the eye interior with an extended light source; another system utilized a light bundle having a disk shaped cross-section axially aligned with the observation system and a third prior art system involved the disk shaped source unaligned with the observation system. Only extremely large strands and objects or strands and objects having a great difference in index of refraction from the surrounding medium could be viewed using these techniques.

BRIEF DESCRIPTION OF THE PRESENT INVENTION AND DRAWINGS

Illumination of the interior portion of the eye from an annular light source, usually focused on the retina, and an observation system having a diaphragm or the equivalent to either partially occlude or retard the reflected image of the annular light source and an optical system capable of focusing on an object or strand in the eye enables one skilled in the art to visually observe or photograph vitreous strands or similar transparent objects in the vitreous humor or lens.

FIG. 1 includes four photographs with those identified as $a$, $b$ and $c$ being results obtained by the prior art techniques and the photograph identified as $d$ is a photogtgraph taken according to the method of the present invention;

DETAILED DESCRIPTION OF THE DRAWINGS

Figure 2:
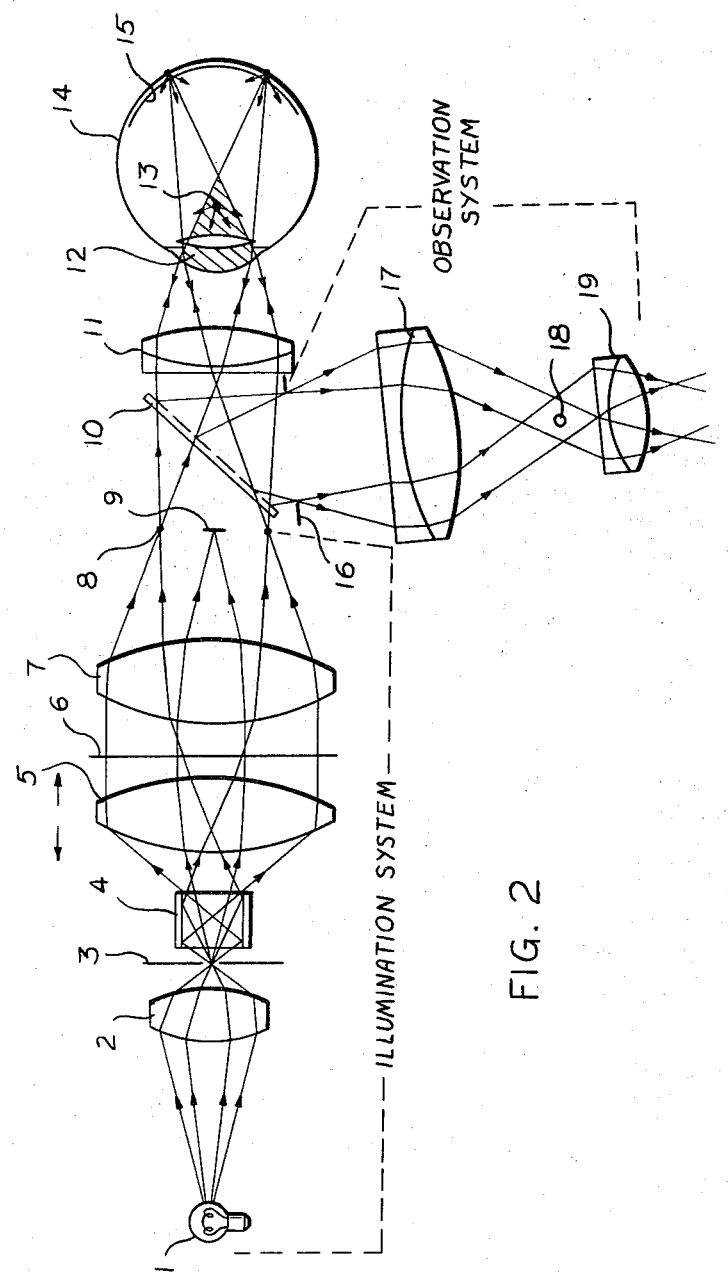
FIG. 2 is a schematic drawing of one embodiment of the present invention.

Referring to FIG. 2, the illumination system comprises an incandescent lamp with a condenser lens 2 followed by a diaphragm 3 and a glass cylinder 4. A pair of lenses 5 and 7 are adapted to form an annular light source 8 in combination with occluder 9 which masks light transmitted through glass cylinder 4 without reflection. Lens 5 is axially movable to provide focusing of the diaphragm plane 3 at the annular light source 8. Light filter 6 is placed between lenses 5 and 7 to provide a selected wavelength of light which maximizes the effect of the mismatch in index of refraction between the transparent object and the vitreous humor. The unit identified as the illumination system is axially adjustable along the optical axis. Lens 11 focuses the annular light source on the retina 15 in the eye under inspection 14. The volume of the eye defined by the area 12 is the preferred inspection volume since all strands are visible therein irrespective of their axis of orientation.

Beam splitter 10 is used in conjunction with the observation system to view the transparent object or strand 13. Diaphragm 16 is located in the image plane of the annular light source and a telescopic system including an objective lens system 17 and eyepiece system 19 is used to observe the strand 18. The observation system is adjustable to enable re-focusing in order to provide a sharp image of strands located in different portions of the eye 14. The diaphragm 16 is preferably adjusted to a diameter of a circle which is equal to the inner circle of the cross-section of the annular light source in the plane of the diaphragm. In place of a diaphragm in the observation system, one can use an occluding ring of dimensions corresponding to those of the image of the annular light source or a phase retarding annulus of the same dimensions as the occluding ring providing phase retardation of one quarter wavelength of the light used. It is also possible to use a semi-transparent annulus or a semi-transparent annulus in combination with a phase retarding annulus.

The selection of the precise dimensions of the annular ring and the diaphragm or its equivalents are well within the skill of those familiar with systems utilizing phase and amplitude contrast and Schlieren principles of optics.

By axial adjustment of the illumination system, one can select the portion of the eye defining the preferred inspection volume. By adjustment of a focusing mechanism in the observation system, one can focus on a strand in any area under inspection.

Figure 3:
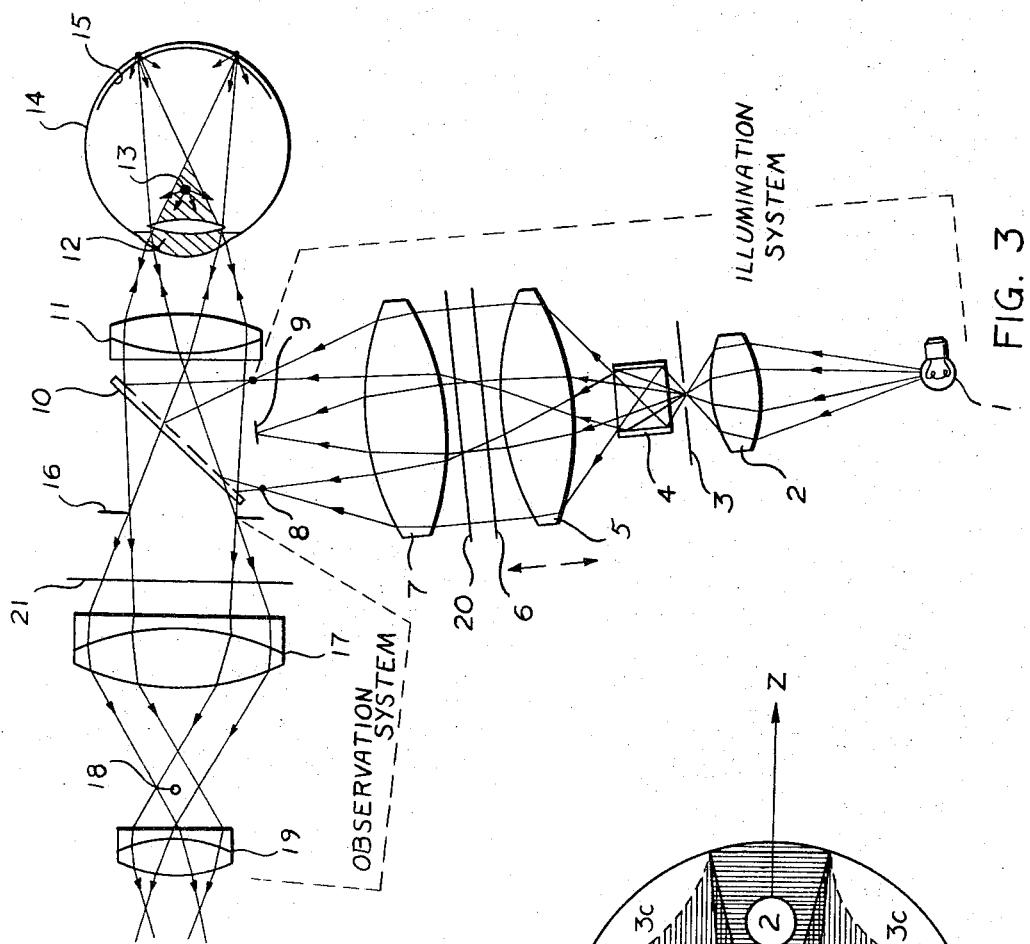
FIG. 3 is a preferred embodiment of the present invention.

FIG. 3 is a preferred embodiment substantially the same as that illustrated in FIG. 2 with the positions of the observation and illumination system respectively exchanged. The apparatus of FIG. 3 is further modified by the use of crossed polarizer 20 and analyzer 21 which is desirable to reduce stray light and enhance the image. Since the retina acts as a diffuser, polarized light eminating from the annular light source 8 is not cancelled by crossed analyzer 21.

Figure 4:
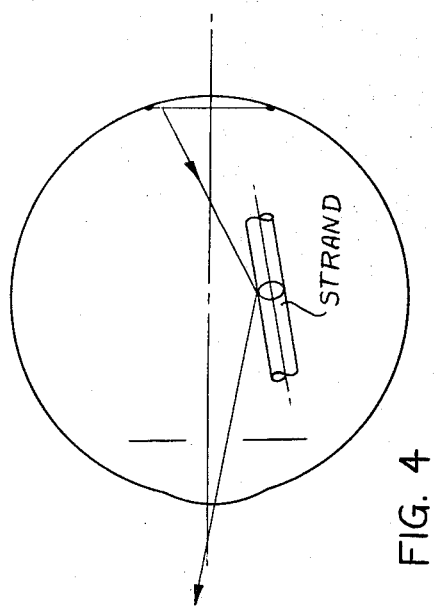
FIG. 4 is a side view of an eye partly in cross-section illustrating a strand located therein.

FIG. 4 illustrates a strand located in the eye and depicts one method of deflection of light by such an abnormality.

Figure 5:
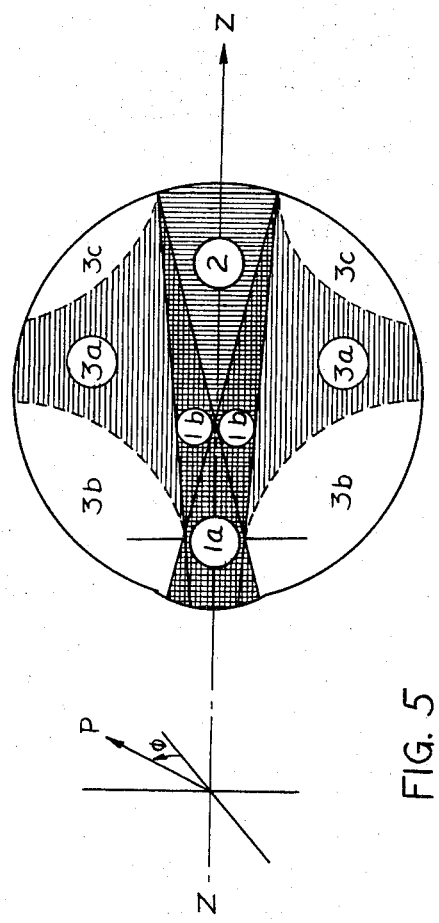
FIG. 5 is a graphic cross-section of the eye showing in plane view the portions of the eye having different visibility qualifications for strands and/or objects located therein with a reference vector diagram for orientation purposes.

FIG. 5 presents a graphic cross-section defining the volumes of the eye having different visibility requirements for foreign objects such as vitreous strands located therein and a vector diagram for reference orientation purposes. These volumes, as illustrated, apply only when the optical axis of illumination and observation corresponds with the Z-axis of the vector diagram. It is within the scope of the invention and contemplated to scan the eye by annular rotation of the Z-axis in order to maximize the visibility of abnormal transparent objects. All strands located in the crosshatched

i.e., volumes 1a and 1b, are visible regardless of orientation. In the vertically crosshatched

volumes, strands positioned in a plane with Z constant are visible while strands parallel to the Z-axis are not visible. In the horizontally crosshatched

volumes, strands located in a plane $\rho$ constant are visible and radial strands are not visible. In the unlined volumes, strands having an axis which lies on the arc of a circle $\rho$ constant, Z-constant are visible while radial strands and strands positioned parallel to the Z-axis are not visible. As mentioned above, by rotation of the Z-axis, strands which might otherwise be invisible due to their orientation and visibility requirements may be visualized, since visibility requirements are changed and a substantial volume of the eye can be covered by the preferred inspection volume having no orientation limitations for visibility.

Figure 1:
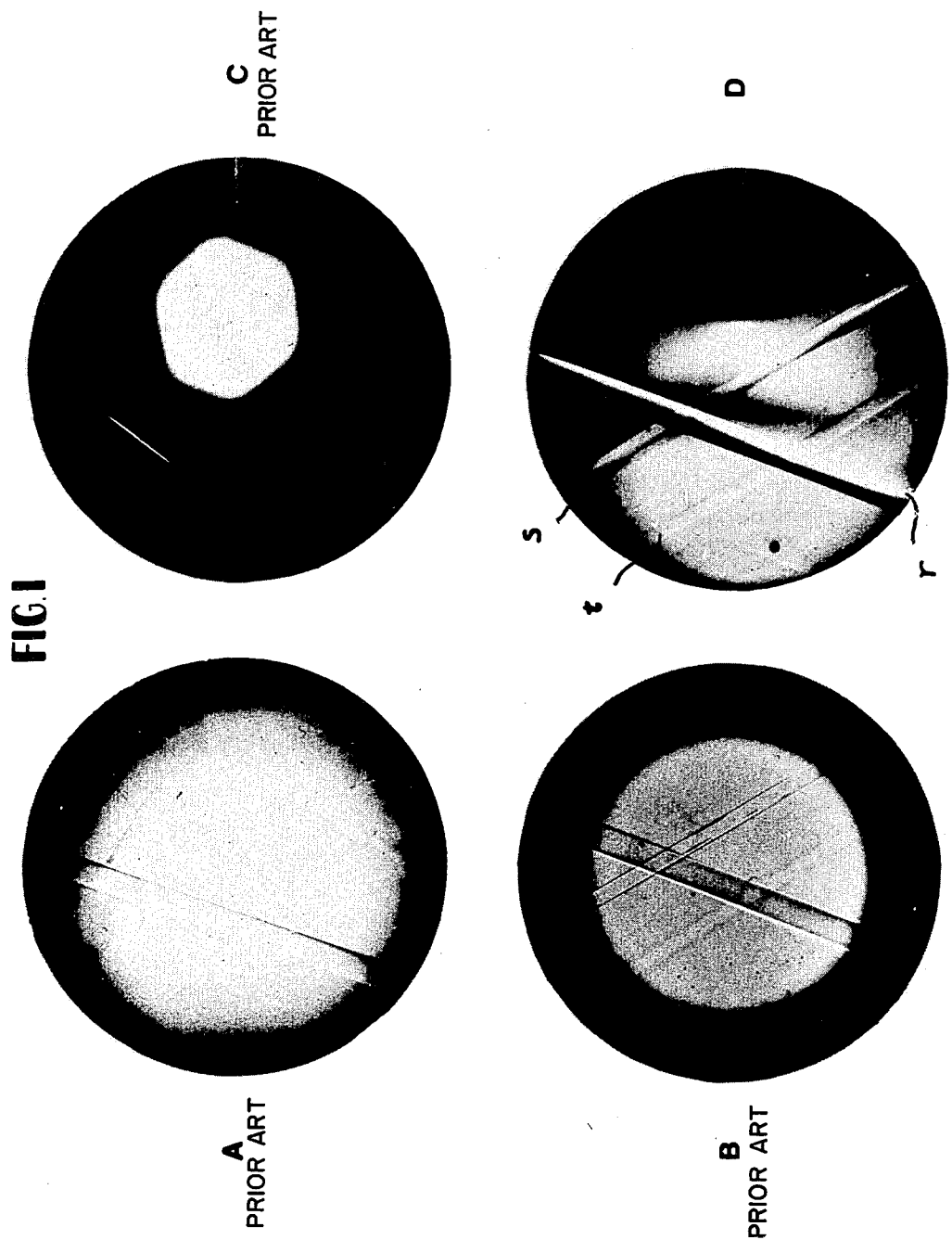

The comparison photographs in FIG. 1 illustrate the substantial improvement obtained by the method and apparatus of the present invention. The three strands were photographed by four different procedures in the same medium using the same strands in the same positions. The r strand has a diameter of 0.9mm and a difference in index of refraction, $\Delta n$, of 0.015. The s and t fibers each have a diameter of 0.6mm and a $\Delta n$ of 0.003 and 0.001, respectively. The method and apparatus of the present invention is the only system capable of producing three dimensional appearing images of strands with a sensitivity sufficient to clearly visualize small strands with miniscule changes in index of refraction from the surrounding medium.

It may occur to others of ordinary skill in the art to make modifications of the present invention which will lie within the concept and scope thereof and will not constitute a departure therefrom. Accordingly, it is intended that the invention be not limited by the details in which it has been described, but that it encompass all within the purview of the following claims.

What is claimed is:

1. A method of detecting and observing an abnormal transparent object in an eye which object has an index of refraction different from that of the surrounding medium, which comprises projecting light from an annular light source into the interior of said eye through the pupil, imaging said annular light source on the retina, collecting light reflected from the retina and producing an image of the transparent object using light deflected by said object after reflection from the retina whereby said object may be detected and observed.

2. The method according to claim 1 wherein said transparent object is a vitreous strand having an index of refraction differing by at least 0.001 from that of the surrounding medium.

3. The method according to claim 2 wherein said image of the strand is produced by diffraction using a diaphragm to modify said reflected image of the annular light source.

4. The method according to claim 2 wherein said image of the strand is produced by interference using a quarter wavelength phase retardation plate to modify said reflected image of the annular light source.

5. The method according to claim 2 wherein an image of said annular light source is focused on the retina.

6. Apparatus for detecting and observing an abnormal transparent object in an eye, said object having an index of refraction different from that of the surrounding medium, which comprises an annular light source, means to focus the light from said source on the retina of the eye, means to collect light reflected from the retina through the pupil and means to produce an image of the object from light reflected by the retina and deflected by the object, whereby said object may be detected and observed.

7. The apparatus of claim 6 wherein said means to focus the light and means to collect the light comprise a single optical system having at least one lens.

8. The apparatus of claim 6 wherein said means to produce an image of the object includes a diaphragm defining an opening of substantially the same diameter as the diameter of the inner circumference of the annular light source and positioned in the plane of the image of the annular light source reflected by the retina to substantially occlude the image of the annular light source.

9. The apparatus of claim 6 wherein said means to produce an image of the object includes an annulus of substantially the same dimensions as the annular light source, said annulus is positioned in the plane of the image of the annular light source reflected by the retina to spacially modify the image of the annular light source.

10. The apparatus of claim 6 wherein said means to produce an image of the object includes means to retard the light forming said image to produce an image of the object by interference techniques.

11. Apparatus for detecting and observing abnormal transparent objects in an eye comprising a source of illumination, an optical system to produce an annular light source from the illumination, a lens system being adapted to focus said annular light source on the retina of an eye under examination and being adapted to collect light reflected through the pupil of the eye under examination, beam splitting means to deflect the reflected light from the source light and optical means to image the collected light reflected from the retina and deflected by said object whereby said object may be detected and observed.

12. The apparatus of claim 11 wherein said optical system comprises, in series, a condenser lens, a diaphragm, a glass cylinder, a focusing lens, a light filter and an objective lens all in alignment.

13. The apparatus of claim 11 wherein said optical means includes a diaphragm defining an opening having a diameter substantially equal to the diameter of the inner circumference of the annular light source and is located in the reflected image plane of the annular light source.

14. The apparatus of claim 12 wherein said optical means includes a diaphragm defining an opening having a diameter substantially equal to the diameter of the inner circumference of the annular light source and is located in the reflected image plane of the annular light source.

15. The apparatus of claim 11 wherein said optical means includes a quarter wavelength phase retardation plate.

16. The apparatus of claim 12 wherein said optical means includes a quarter wavelength phase retardation plate.

* * * * *